United States Patent Office 3,384,673
Patented May 21, 1968

3,384,673
STABILIZATION
Milton J. Blankenship, Midland, and Ralph McCarthy, Bay City, Mich., assignors to The Dow Chemical Company, Midland, Mich., a corporation of Delaware
No Drawing. Filed Mar. 7, 1966, Ser. No. 532,119
5 Claims. (Cl. 260—652.5)

ABSTRACT OF THE DISCLOSURE

Methyl chloroform is effectively stabilized against reaction with metals such as iron and aluminum by incorporation in the methyl chloroform of up to fifteen percent by weight of a dithiane or a thioxane. The inhibited methyl chloroform is also thereby stabilized against oxidative decomposition in the presence of iron.

This invention relates to the stabilization of methyl chloroform. More particularly, the present invention relates to the stabilization of methyl chloroform in the presence of metals which tend to decompose methyl chloroform.

It is known that methyl chloroform reacts with certain metals and that this reaction results in the simultaneous decomposition of metal and methyl chloroform. This reaction is especially violent with aluminum.

It has now been found that this reaction of methyl chloroform and metal may be substantially retarded or prevented by incorporating an inhibiting (or stabilizing) amount of a thiane compound into the methyl chloroform.

Thiane compounds which may be used as inhibitors may be represented by the formula

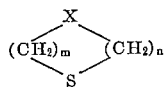

wherein X is selected from the group consisting of the oxygen atom and the sulfur atom, each of $n$ and $m$ is an integer of from 0 to 4 when X is sulfur, each of $n$ and $m$ is an integer of from 1 to 3 when X is oxygen, and the sum of $n$ and $m$ is always equal to four. Thus, suitable inhibiting compounds include ortho-, meta- and para-dithiane, para-oxathiane (1,4-thioxane) and meta-oxathiane.

A special advantage of the inhibited methyl chloroform compositions of the invention is that the compositions (especially those containing a dithiane) are also stabilized against oxidative decomposition by oxygen in the presence of metals such as iron (usually in the form of the steel alloys).

Only an amount of thiane compound sufficient to retard or stop the reaction of metal and methyl chloroform is required. Ordinarily, amounts of from about 0.2 to 10-15 percent by weight (based upon the total weight of the stabilized methyl chloroform composition) of thiane compound may be combined with the methyl chloroform. The preferred concentration of thiane compound in the methyl chloroform is from about 1.0 to 5.0 percent by weight (based upon the total weight of the composition).

The thiane inhibitor compounds may be used alone or in combination with other conventional non-reactive inhibitors.

The following examples are submitted for the purpose of illustration only and are not to be construed as limiting the scope of the invention in any way.

Examples I–IV.—General method

A given weight percent of the stabilizing compound was added to a ten milliliter sample of uninhibited 1,1,1-trichloroethane (methyl chloroform). An 18 gauge aluminum coupon (2½ inches by ½ inch by approximately 0.04 to 0.05 inch thick) was immersed in the test solution and scratched beneath the surface of the test liquid. The aluminum coupon was observed visually and the results recorded in Table 1 according to the following standards:

| Key number: | Indicated results |
|---|---|
| 3 | No reaction. |
| 2 | Reaction starts but subsides (or stops) within 10 minutes. |
| 1 | Reaction slows down but continues after 10 minutes. |
| 0 | Little or no inhibition; violent reaction. |

The aluminum coupon used was alloy 1100 (standard designation of the Aluminum Association) and had the following standard composition (percent by weight):

|  | Percent |
|---|---|
| (1) Aluminum (minimum) | 99.00 |
| (2) Si and Fe (maximum) | 1.0 |
| (3) Cu (maximum) | 0.20 |
| (4) Mn (maximum) | 0.05 |
| (5) Zn (maximum) | 0.10 |
| Total | <1.0 |

TABLE 1

| Example Number | Compound | Concentration in Methyl Chloroform, wt. percent | Result |
|---|---|---|---|
| I | Meta-dithiane (C₄H₈S₂) | 4.0 | 3 |
|  | (structure) | 2.0 | 3 |
|  |  | 1.6 | 1 |
| II | Ortho-dithiane | 4.0 | 3 |
|  | (structure) | 3.0 | 3 |
|  |  | 2.0 | 1 |
| III | Para-dithiane | 4.0 | 3 |
|  | (structure) | 3.0 | 3 |
|  |  | 2.0 | 1 |
| IV | Para-oxathiane (C₄H₈OS) | 2.5 | 3 |

In a comparative accelerated oxidation test according to MIL-T-7003, a sample of 200 milliliters of methyl chloroform containing 2 p.p.m. of HCl and 4.0 percent by weight of 1,4-dithiane was compared with 200 milliliters of an identical sample of methyl chloroform containing 2 p.p.m. HCl and 4.0 percent by weight of 1,4-dioxane. In this standard accelerated oxidation test, a flask equipped with a reflux condenser is filled with about 200 milliliters of the sample. A strip of steel ½ inch by 2 inches by $\frac{1}{16}$ inch is suspended by means of a copper wire above the liquid sample and another strip of steel (¼ inch by ¾ inch by $\frac{1}{16}$ inch) is placed in the bottom of the flask beneath the surface of the liquid sample. The steel strips conform to S.A.E. standard steels with the range of 1010 to 1040, inclusive. An oxygen delivery tube is extended to ¼ inch from the bottom of the flask containing the steel samples. An oxygen flow rate of 10–12 bubbles per minute was maintained (using standard equipment) and a 150 watt frosted light bulb located beneath the flask was switched on. Oxygen was bubbled through the liquid samples in the flask under these conditions for 48 hours. The flasks were allowed to cool to room temperature, 25 milliliter samples were withdrawn and the acidity (an indication of oxidative decomposition) of each sample determined. The methyl chloroform sample inhibited with 1,4-dithiane had an acidity (as HCl) of 5 p.p.m. after 48 hours, whereas the acidity of the sample inhibited with an equal amount of 1,4-dioxane (for the same time period) contained 260 p.p.m. of acid.

We claim as our invention:

1. Methyl chloroform containing a stabilizing amount of a compound of the formula

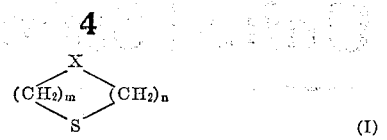

wherein:
(a) X is selected from the group consisting of oxygen and sulfur,
(b) When X is sulfur, each of $m$ and $n$ is an integer of from 0 to 4 such that $m+n=4$, and
(c) when X is oxygen, each of $m$ and $n$ is an integer of from 1 to 3 such that $m+n=4$.

2. The composition of claim 1 wherein up to 15 percent by weight of compound (I) is incorporated into the methyl chloroform.

3. The composition of claim 1 wherein X is sulfur.

4. The composition of claim 1 wherein X is oxygen.

5. The composition of claim 1 wherein the compound (I) is para-dithiane.

References Cited

UNITED STATES PATENTS 2,811,252   10/1957   Bachtel _____ 260—652.5

LEON ZITVER, *Primary Examiner.*

M. JACOB, *Assistant Examiner.*